United States Patent
Childress

(10) Patent No.: US 10,660,492 B2
(45) Date of Patent: May 26, 2020

(54) LAVATORY DEBRIS REMOVAL

(71) Applicant: The Boeing Company, Chicago, IL (US)

(72) Inventor: James Childress, Mercer Island, WA (US)

(73) Assignee: The Boeing Company, Chicago, IL (US)

(*) Notice: Subject to any disclaimer, the term of this patent is extended or adjusted under 35 U.S.C. 154(b) by 33 days.

(21) Appl. No.: 15/618,855

(22) Filed: Jun. 9, 2017

(65) Prior Publication Data

US 2018/0353025 A1 Dec. 13, 2018

(51) Int. Cl.

| A47L 7/00 | (2006.01) |
|---|---|
| B64D 11/02 | (2006.01) |
| B64F 5/30 | (2017.01) |
| A47L 5/38 | (2006.01) |
| A47L 9/00 | (2006.01) |
| A47L 9/24 | (2006.01) |
| A47L 9/28 | (2006.01) |
| A47L 9/32 | (2006.01) |
| E03D 9/00 | (2006.01) |
| E03F 1/00 | (2006.01) |

(52) U.S. Cl.
CPC ............ *A47L 7/0076* (2013.01); *A47L 5/38* (2013.01); *A47L 9/0036* (2013.01); *A47L 9/242* (2013.01); *A47L 9/2836* (2013.01); *A47L 9/2857* (2013.01); *A47L 9/327* (2013.01); *B64D 11/02* (2013.01); *B64F 5/30* (2017.01); *E03D 9/00* (2013.01); *E03F 1/006* (2013.01)

(58) Field of Classification Search
None
See application file for complete search history.

(56) References Cited

U.S. PATENT DOCUMENTS

| 3,995,328 A | 12/1976 | Carolan et al. |
|---|---|---|
| 4,063,315 A | 12/1977 | Carolan et al. |
| 4,819,276 A | 4/1989 | Stevens |

(Continued)

FOREIGN PATENT DOCUMENTS

| EP | 0083179 A1 | 7/1983 |
|---|---|---|
| EP | 3323724 A1 | 5/2018 |

(Continued)

OTHER PUBLICATIONS

Childress et al. "Systems and Methods for Cleaning a Lavatory Floor", U.S. Appl. No. 15/175,254, filed Jun. 7, 2016, 38 pages.

(Continued)

*Primary Examiner* — Eric W Golightly
(74) *Attorney, Agent, or Firm* — Yee & Associates, P.C.

(57) ABSTRACT

A method of removing debris from a lavatory on a vehicle, a lavatory debris removal vacuum apparatus, and a method of manufacturing a debris removal vacuum system. A vacuum supply line is connected to a vacuum toilet in a lavatory and configured to provide suction to the vacuum toilet. A vacuum socket is connected to the vacuum supply line and configured to have a tube attached thereto that extends from the vacuum socket into the lavatory. The suction is provided by the vacuum supply line through the vacuum socket to the tube to remove debris from the lavatory into the tube as the tube is positioned in the lavatory by an operator.

20 Claims, 9 Drawing Sheets

(56) References Cited

U.S. PATENT DOCUMENTS

| | | | |
|---|---|---|---|
| 5,394,601 A * | 3/1995 | Sutton | B23P 19/00 |
| | | | 29/240 |
| 2003/0177572 A1 | 9/2003 | Guerin et al. | |
| 2006/0236490 A1 | 10/2006 | Blitz et al. | |
| 2011/0099700 A1 | 5/2011 | Seibt et al. | |
| 2012/0119029 A1 | 5/2012 | Tappe et al. | |
| 2014/0115764 A1 | 5/2014 | Cheng | |

FOREIGN PATENT DOCUMENTS

| | | |
|---|---|---|
| FR | 2889935 A1 | 3/2007 |
| WO | WO2014036217 A2 | 3/2014 |
| WO | WO2017147725 A1 | 9/2017 |

OTHER PUBLICATIONS

European Patent Office Extended Search Report, dated Sep. 12, 2018, regarding Application No. EP18173743.8, 11 pages.
European Space Agency, "International Space Station Toilet Tour," Youtube.com, Published May 8, 2015, 1 page. https://www.youtube.com/watch?v=C-65mBQ7s_Q.
European Patent Office Action dated Oct. 4, 2019, regarding Application No. 18173743.8-1010, 5 pages.

* cited by examiner

LAVATORY DEBRIS REMOVAL

BACKGROUND INFORMATION

1. Field

The present disclosure relates generally to vacuum cleaning systems and methods, and in particular, to vacuum cleaning systems and methods for use on aircraft. More particularly, the present disclosure relates to a method and apparatus for removing debris from a lavatory having a vacuum toilet.

2. Background

Lavatories may be provided on commercial passenger aircraft or other aircraft for use by passengers and crew on the aircraft. A lavatory on an aircraft may be equipped with a vacuum toilet. Material may be sucked from the vacuum toilet into a holding tank on the aircraft via a vacuum supply line. When the aircraft is in flight, suction on the vacuum supply line may be provided by a pressure differential between an end of the vacuum supply line connected to the toilet located in a pressurized cabin of the aircraft and a vent on the vacuum supply line located outside of the pressurized cabin. When the aircraft is on the ground, or in other situations when the part of the aircraft in which the vacuum toilet is located is not pressurized, or the difference in pressure between the area and the outside of the aircraft is not sufficient, suction on the vacuum supply line may be provided by using a blower to create the pressure differential.

An aircraft lavatory is generally cleaned between flights. For example, maintenance or cleaning personnel may clean the lavatory when the aircraft is on the ground between flights.

During a flight, the cleanliness of the lavatory on an aircraft may be compromised. Various types of solid waste may be left on the floor and other surfaces of a lavatory as the lavatory is used by passengers and crew during a flight. Debris in the lavatory may give the impression of unsanitary conditions. A significant amount or particular type of solid waste on the floor or other surfaces of the lavatory may result in the lavatory being closed for the duration of a flight.

Therefore, there may be a need for a method and apparatus that take into account at least some of the issues discussed above, as well as other possible issues.

SUMMARY

In one illustrative embodiment, an apparatus comprises a vacuum toilet in a lavatory, a vacuum supply line connected to the vacuum toilet, and a vacuum socket. The vacuum supply line is configured to provide suction to the vacuum toilet. The vacuum socket is connected to the vacuum supply line and configured to have a tube attached thereto that extends from the vacuum socket into the lavatory. Suction is provided by the vacuum supply line through the vacuum socket to the tube to remove debris from the lavatory into the tube as the tube is positioned in the lavatory by an operator.

In another illustrative embodiment, a method of manufacturing a debris removal vacuum system comprises installing a vacuum socket in a lavatory and connecting the vacuum socket to a vacuum supply line. The vacuum socket is configured to have a tube attached thereto that extends from the vacuum socket into the lavatory. The vacuum supply line is connected to a vacuum toilet in the lavatory to provide suction to the vacuum toilet and such that the suction is provided by the vacuum supply line through the vacuum socket to the tube to pick up debris from the lavatory into the tube when the tube is attached to the vacuum socket and positioned in the lavatory by an operator.

In yet another illustrative embodiment, a method of removing debris from a lavatory on a vehicle comprises providing suction to a tube by a vacuum supply line through a vacuum socket. The vacuum supply line is connected to the vacuum socket and to a vacuum toilet in the lavatory to provide the suction to the vacuum socket and to the vacuum toilet. The tube is attached to the vacuum socket. The tube is extended from the vacuum socket into the lavatory to remove debris from the lavatory into the tube when the tube is positioned in the lavatory by an operator.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have the capability of removing debris from a lavatory on a vehicle, such as an aircraft. For example, it may be desirable to have the capability to remove debris from a lavatory on an aircraft while the aircraft is in flight. Further, the illustrative embodiments recognize and take into account that it may be desirable to have a method and apparatus for removing debris from a lavatory that is easily performed by a crewmember or other person onboard an aircraft during a flight.

The illustrative embodiments provide a vacuum system for removing solid debris from the floor and other surfaces of a lavatory by the crew of an aircraft in flight. A lavatory debris removal vacuum system, in accordance with an illustrative embodiment, may be tied to the vacuum supply line for the vacuum toilet in the lavatory, so no secondary vacuum is needed. The illustrative embodiments may include a vacuum hose that may plug into a vacuum socket or may be extended from a storage compartment. The compartment may be covered and locked so that only authorized personnel may access the vacuum socket and hose. A handle at the distal end of the hose allows the hose to be used by the flight crew without touching the hose itself. The handle may be configured to swivel and fold and unfold between a compact configuration for storage and an unfolded configuration for use.

Figure 1:
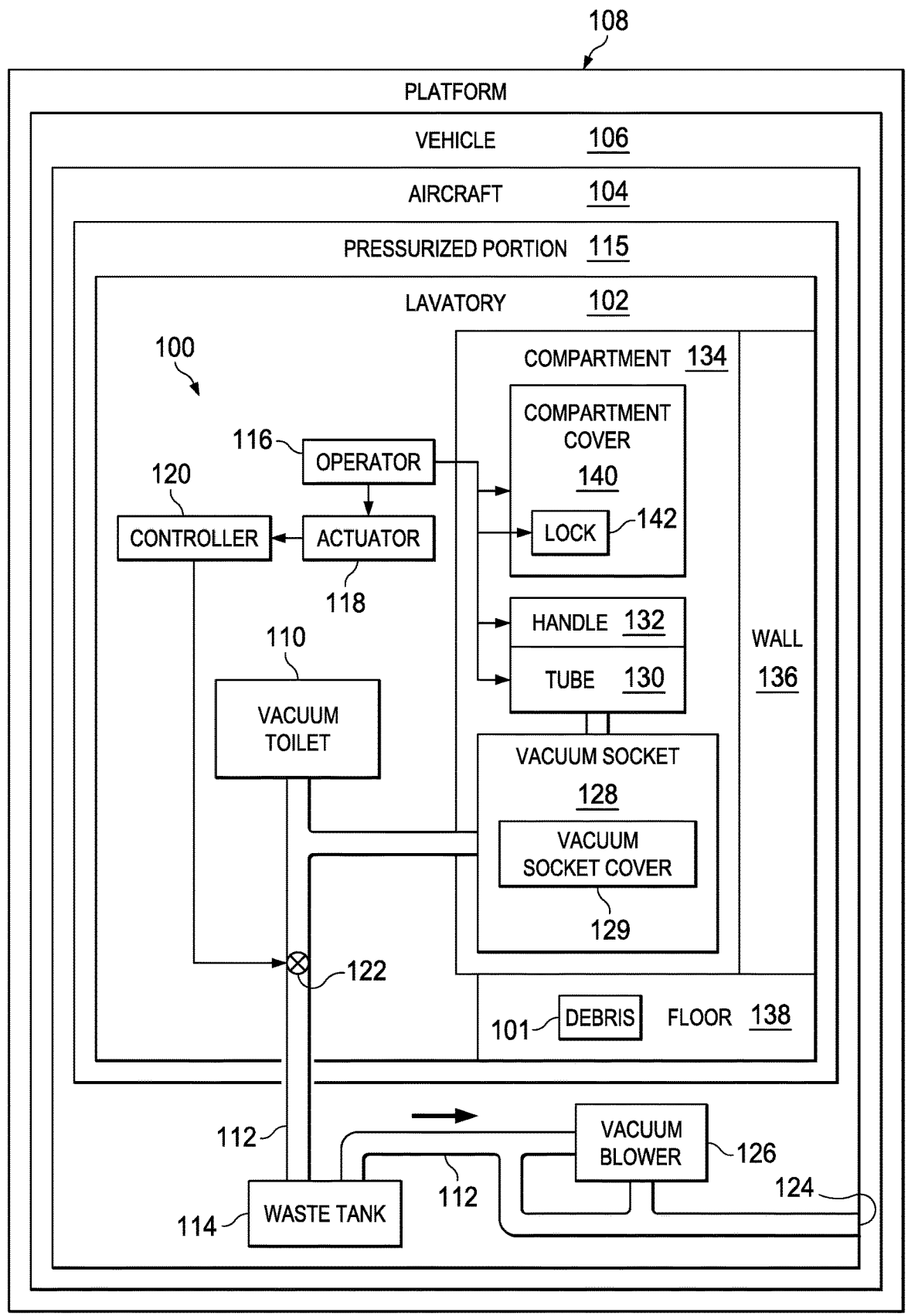
FIG. 1 is an illustration of a block diagram of a lavatory debris removal vacuum system in accordance with an illustrative embodiment.

Turning to FIG. 1, an illustration of a block diagram of a lavatory debris removal vacuum system is depicted in accordance with an illustrative embodiment. For example, without limitation, lavatory debris removal vacuum system 100 may be used to remove debris 101 from floor 138 or other surfaces of lavatory 102 on aircraft 104. Debris 101 may include any solid pieces of any material on floor 138 or other surfaces of lavatory 102 that it may be desirable to remove from lavatory 102 to restore the cleanliness of lavatory 102.

Aircraft 104 may be any appropriate type of aircraft. For example, without limitation, aircraft 104 may be a commercial passenger aircraft. Alternatively, aircraft 104 may be a cargo aircraft, a military aircraft, or any other type of aircraft configured for any appropriate purpose or mission. Aircraft 104 may be a fixed wing, rotary wing, or lighter than air aircraft.

Aircraft 104 may be an example of one type of vehicle 106 in which the illustrative embodiments may be implemented. The illustrative embodiments may be implemented in vehicle 106 other than aircraft 104. For example, without limitation, vehicle 106 may be any vehicle configured for operation on land, on water, under water, in the air, in space, or in any other appropriate medium or combination of mediums.

Vehicle 106 may be an example of one type of platform 108 in which the illustrative embodiments may be implemented. The illustrative embodiments may be implemented on platform 108 other than vehicle 106. For example, without limitation, platform 108 may comprise any appropriate fixed or mobile platform.

Lavatory 102 may include vacuum toilet 110. Material may be sucked from vacuum toilet 110 into waste tank 114 by vacuum supply line 112. Suction may be provided on vacuum supply line 112 in any appropriate manner.

For example, without limitation, vacuum toilet 110 may be located in lavatory 102 in pressurized portion 115 of aircraft 104. In this case, when aircraft 104 is in flight, suction on vacuum supply line 112 may be provided by a pressure differential between an end of vacuum supply line 112 connected to vacuum toilet 110 located in pressurized portion 115 of aircraft 104 and vent 124 on vacuum supply line 112 located outside of pressurized portion 115. When aircraft 104 is on the ground, or in other situations when the part of aircraft 104 in which vacuum toilet 110 is located is not pressurized, or the difference in pressure between the area and the outside of aircraft 104 is not sufficient, suction on vacuum supply line 112 may be provided by using vacuum blower 126 to create the pressure differential.

Valve 122 on vacuum supply line 112 may be used to control when the suction on vacuum supply line 112 is provided to vacuum toilet 110. For example, without limitation, operator 116 may "flush" vacuum toilet 110 by operating actuator 118. For example, without limitation, actuator 118 may comprise a button, lever, or any other appropriate actuator operable by human operator 116. In response to operation of actuator 118, controller 120 may open valve 122 to suck material from vacuum toilet 110 on vacuum supply line 112 for a selected period of time. Controller 120 may comprise any appropriate circuitry, electrical devices, mechanical devices, or any appropriate combination thereof for controlling valve 122 in response to operation of actuator 118.

Lavatory debris removal vacuum system 100 may comprise vacuum socket 128 and tube 130. Vacuum socket 128 is in fluid communication with vacuum supply line 112 and is configured to be connected in fluid communication with tube 130. Vacuum socket 128 may be covered with vacuum socket cover 129 in some illustrative embodiments.

Tube 130 may be flexible or bendable. For example, without limitation, tube 130 may comprise a hose. Tube 130 may be attachable to vacuum socket 128 and removable from vacuum socket 128 by operator 116 without the use of tools. In other words, tube 130 may be attachable to vacuum socket 128 and removable from vacuum socket 128 by operator 116 by hand.

Handle 132 may be provided on tube 130. Operator 116 may use handle 132 to hold tube 130 to position tube 130 in lavatory 102 to remove debris 101 when suction is provided on tube 130 via vacuum socket 128 and vacuum supply line 112. In this illustrative example, operator 116 may operate actuator 118 to provide suction via vacuum supply line 112 to both vacuum toilet 110 and tube 130.

Vacuum socket 128 and tube 130 may be located in compartment 134. For example, without limitation, compartment 134 may comprise any appropriate structure for containing vacuum socket 128 and tube 130. For example, without limitation, compartment may be located on wall 136 of lavatory 102 or in any other appropriate location.

Compartment 134 may be covered with compartment cover 140. Compartment cover 140 may be locked with lock 142 to prevent access to vacuum socket 128 and tube 130 by unauthorized personnel.

Figure 2:
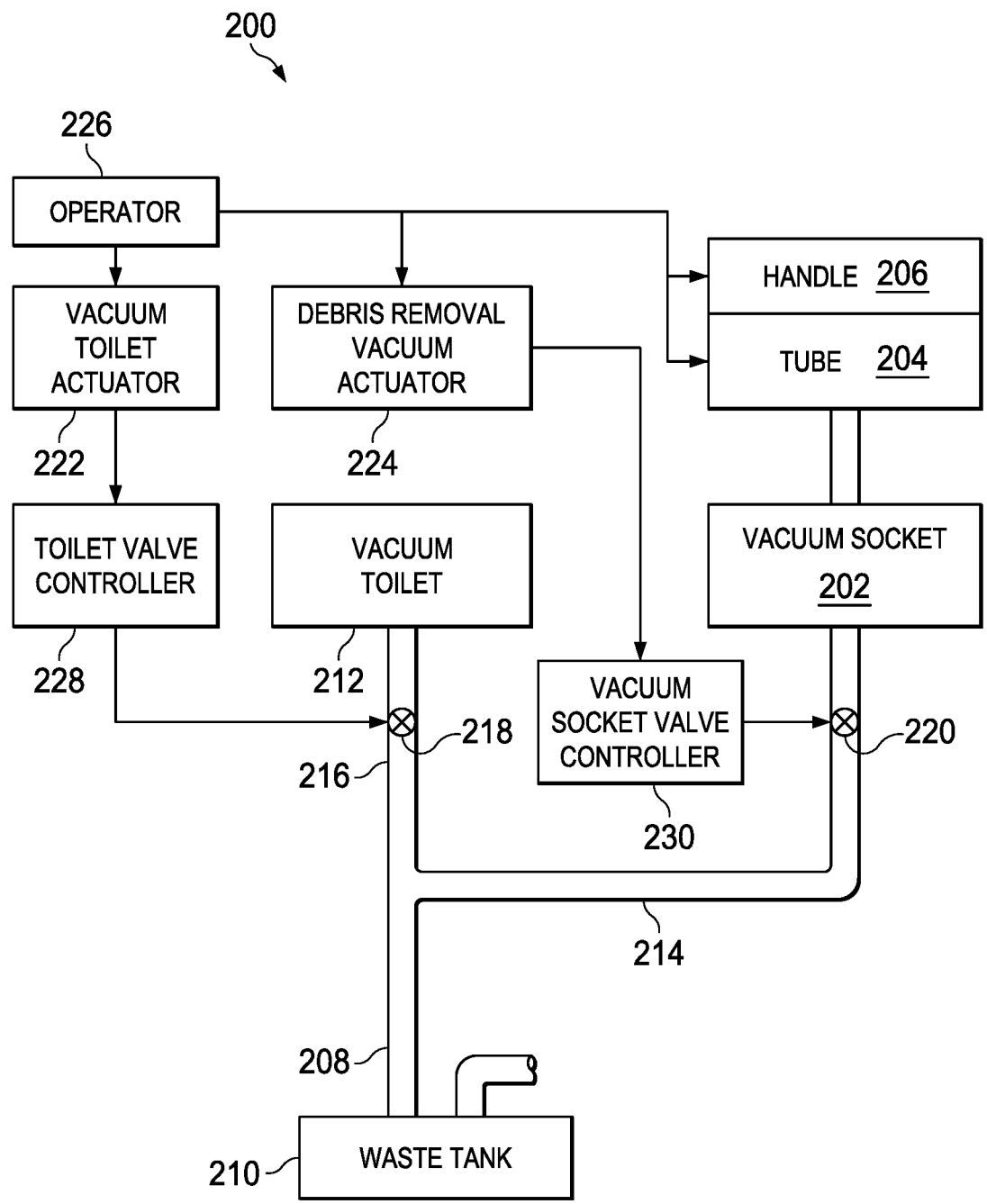
FIG. 2 is an illustration of a block diagram of a lavatory debris removal vacuum system in accordance with another illustrative embodiment.

Turning to FIG. 2, an illustration of a block diagram of a lavatory debris removal vacuum system is depicted in accordance with another illustrative embodiment. Lavatory debris removal vacuum system 200 is similar to lavatory debris removal vacuum system 100 in FIG. 1. However, in lavatory debris removal vacuum system 200, suction provided to vacuum toilet 212 and hose 204 by vacuum supply line 208 may be controlled separately.

In lavatory debris removal vacuum system 200, vacuum supply line 208 branches into vacuum supply line 214 for lavatory debris removal vacuum system 200 and separate vacuum supply line 216 for vacuum toilet 212. Vacuum supply line 214 connects vacuum supply line 208 to vacuum socket 202, to which tube 204 of lavatory debris removal vacuum system 200 may be connected. Vacuum supply line 216 connects vacuum supply line 208 to vacuum toilet 212.

Operator 226 may operator vacuum toilet actuator 222 to operate vacuum toilet 212. In this case, toilet valve controller 228 may be configured to open valve 218 to provide suction to vacuum toilet 212 on vacuum supply line 216 in response to operator 226 operating vacuum toilet actuator 222. Material removed from vacuum toilet 212 via vacuum supply line 216 may then move into and through vacuum supply line 208 into waste tank 210 or any other appropriate location.

Operator 226 may operate debris removal vacuum actuator 224 to operate lavatory debris removal vacuum system 200. In this case, vacuum socket valve controller 230 may be configured to open valve 220 to provide suction to tube 204 on vacuum supply line 214 in response to operator 226 operating debris removal vacuum actuator 224. Operator 226 may then manipulate tube 204 via handle 206 to remove debris from the floor of a lavatory or other location. Debris removed from the lavatory floor or other location via tube 204 and vacuum supply line 214 may then move into and through vacuum supply line 208 into waste tank 210 or any other appropriate location.

The illustrations of lavatory debris removal vacuum system 100 in FIG. 1 and lavatory debris removal vacuum system 200 in FIG. 2 are not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 3:
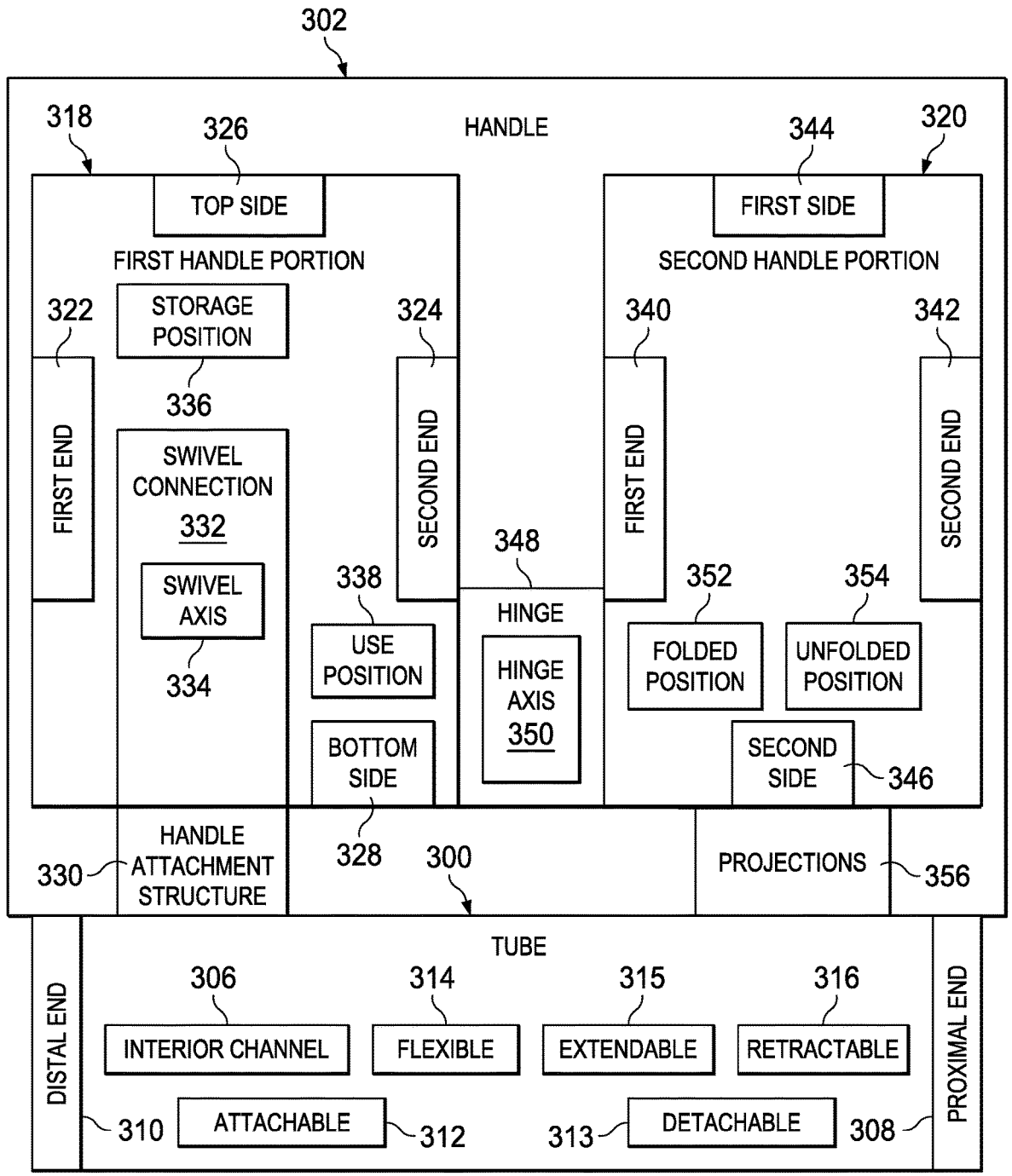
FIG. 3 is an illustration of a block diagram of a tube and a handle for a lavatory debris removal vacuum system in accordance with an illustrative embodiment.

Turning to FIG. 3, an illustration of a block diagram of a tube and a handle for a lavatory debris removal vacuum system is depicted in accordance with an illustrative embodiment. Tube 300 and handle 302 may be an example of one implementation of tube 130 and handle 132 in FIG. 1 or of tube 204 and handle 206 in FIG. 2.

Tube 300 may include interior channel 306 extending from proximal end 308 to distal end 310 of tube 300. Proximal end 308 of tube 300 may be configured to be connected to a vacuum socket in accordance with an illustrative embodiment. Proximal end 308 of tube 300 may be configured in any appropriate manner to be attachable 312 to a vacuum socket and detachable 313 from a vacuum socket.

When proximal end 308 of tube 300 is connected to a vacuum socket, interior channel 306 of tube 300 is connected in fluid communication with the vacuum socket such that suction provided to the vacuum socket by a vacuum supply line is provided via interior channel 306 of tube 300 to distal end 308 of tube 300. Debris thus may be drawn into distal end 308 of tube 300 when suction is provided by a vacuum supply line through a vacuum socket to tube 300.

Tube 300 preferably may be flexible 314, extendable 315, and retractable 316. For example, without limitation, tube 300 may comprise a hose.

Handle 302 may comprise first handle portion 318 and second handle portion 320. First handle portion 318 may comprise first end 322, second end 324, top side 326, and bottom side 328. Any appropriate handle attachment structure 330 may be used to attach first handle portion 318 to tube 300. First handle portion 318 may be connected to handle attachment structure 330 by swivel connection 332. Swivel connection may be configured to allow first handle portion 318 to rotate about swivel axis 334 between storage position 336 and use position 338.

Second handle portion 320 may comprise first end 340, second end 342, first side 344, and second side 346. Projections 356 may extend form second side 346 of second handle portion 320.

First end 340 of second handle portion 320 may be attached to second end 324 of first handle portion 318 by hinge 348. Hinge 348 may be configured in any appropriate manner to allow second handle portion 320 to rotate about hinge axis 350 between folded position 352 and unfolded position 354 with respect to first handle portion 318. Projections 356 on second handle portion 320 may engage hose 300 when second handle portion 320 is in unfolded position 354.

The illustration of tube 300 and handle 302 in FIG. 3 is not meant to imply physical or architectural limitations to the manner in which a hose and a handle for a lavatory debris removal vacuum system in accordance with an illustrative embodiment may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 4:
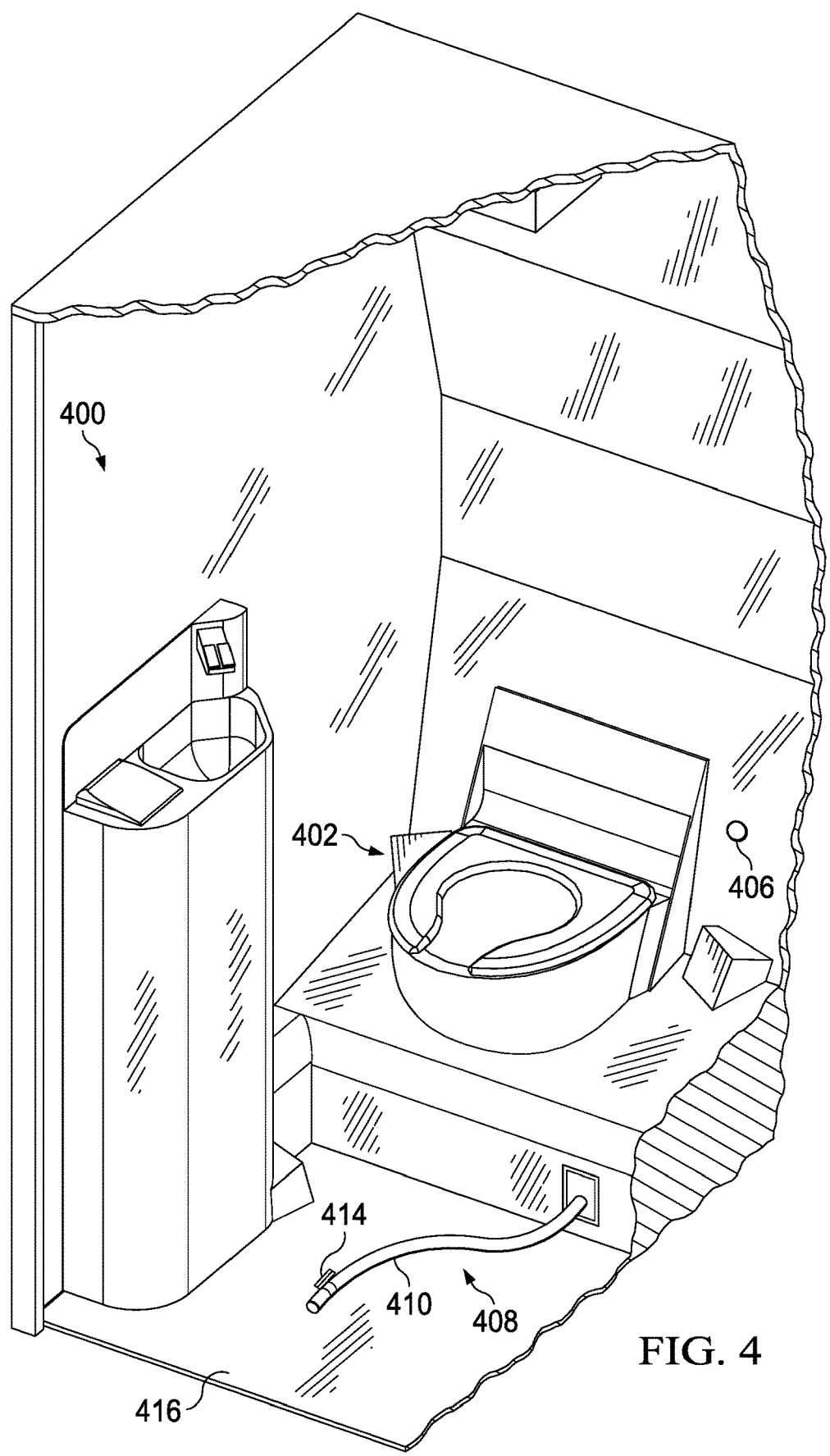
FIG. 4 is a perspective view illustration of a lavatory on an aircraft with a lavatory debris removal vacuum system in accordance with an illustrative embodiment.

Turning to FIG. 4, a perspective view illustration of a lavatory on an aircraft with a lavatory debris removal vacuum system is depicted in accordance with an illustrative embodiment. Lavatory 400, vacuum toilet 402, and lavatory debris removal vacuum system 408 may be examples of implementations of lavatory 102, vacuum toilet 110, and lavatory debris removal vacuum system 100 in FIG. 1.

In this example, vacuum toilet 402 and lavatory debris removal vacuum system 408 may be activated by operating actuator 406. When activated, suction is provided on tube 410 of lavatory debris removal vacuum system 408. A human operator may hold tube 410 by handle 414 to position the distal end of tube 410 to remove debris from floor 416 or other surfaces in lavatory 400.

Figure 5:
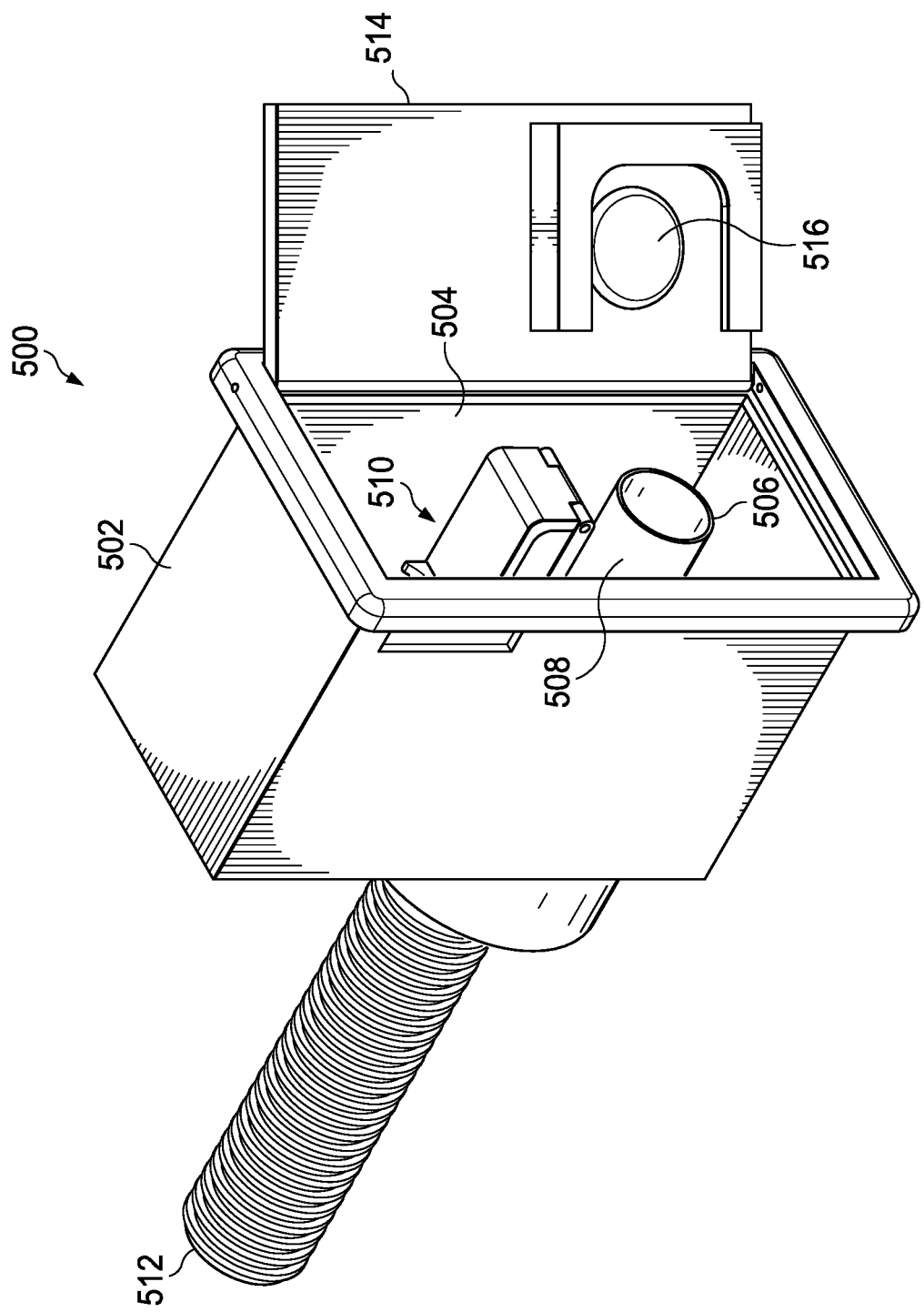
FIG. 5 is a perspective view illustration of a compartment, hose, and handle for a lavatory debris removal vacuum system with the hose in a retracted position and the handle in a folded storage position in accordance with an illustrative embodiment.

Turning FIG. 5, a perspective view illustration of a compartment, a hose, and a handle for a lavatory debris removal vacuum system with the hose in a retracted position and the handle in a folded storage position is depicted in accordance with an illustrative embodiment. Lavatory debris removal vacuum system 500 is an example of one implementation of portions of lavatory debris removal vacuum system 100 in FIG. 1 or lavatory debris removal vacuum system 200 in FIG. 2.

In this example, lavatory debris removal vacuum system 500 includes compartment 502. Hose 508 with handle 510 attached to distal end 506 may be stored in interior 504 of compartment 502. Hose 508 is an example of one implementation of tube 130 in FIG. 1, tube 204 in FIG. 2, or tube 300 in FIG. 3.

In this example, most of hose 508, including proximal end 512 thereof, may be retracted into a space in a wall behind compartment 502 for storage. Access to interior 504 of compartment 502 may be controlled by use of cover 514 for compartment 502 with lock 516.

Figure 6:
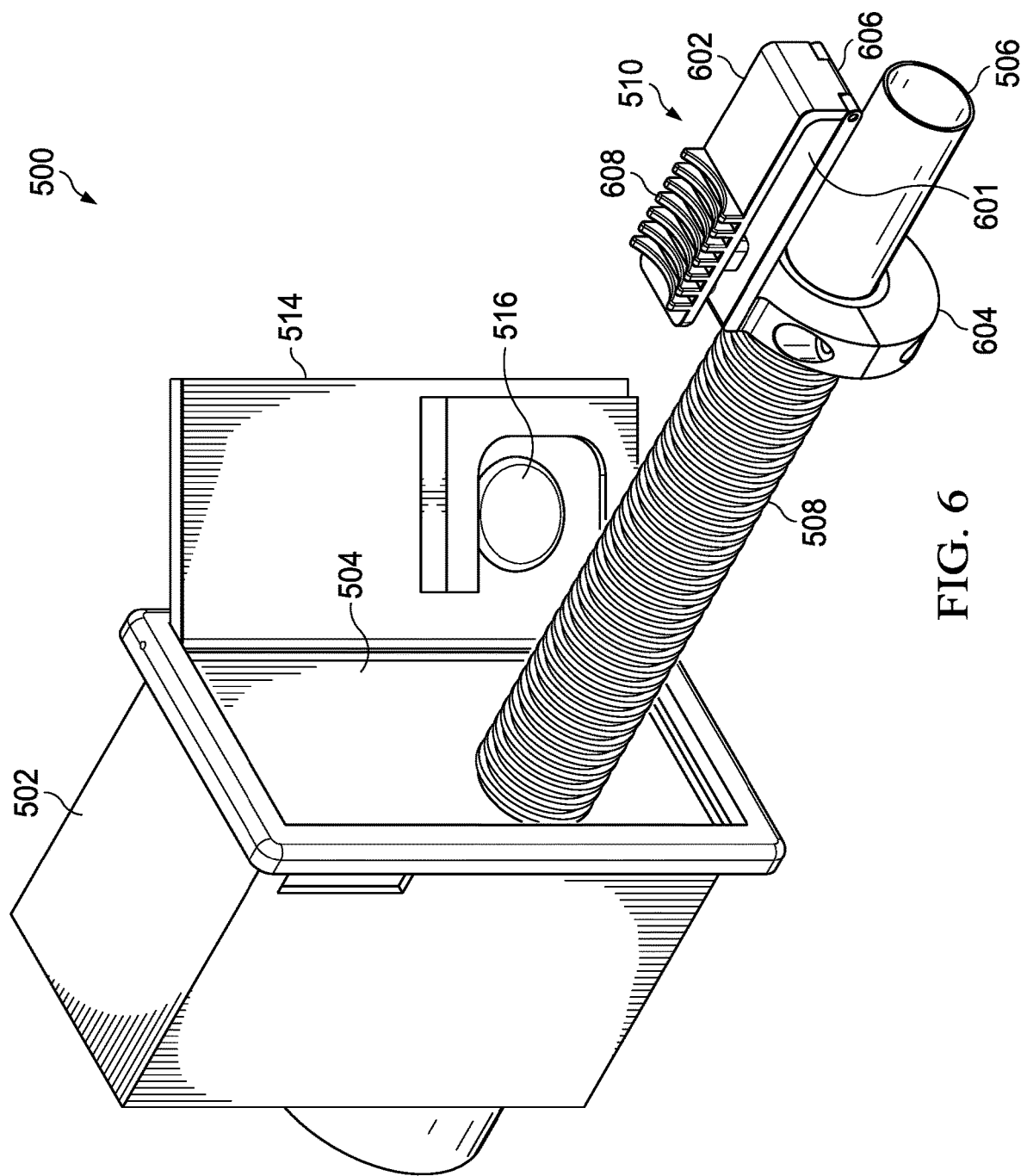
FIG. 6 is a perspective view illustration of the compartment, hose, and handle for the lavatory debris removal vacuum system in accordance with the illustrative embodiment of FIG. 5 with the hose in an extended position.

Turning to FIG. 6, a perspective view illustration of a compartment, a hose, and a handle for the lavatory debris removal vacuum system in accordance with the illustrative embodiment of FIG. 5 is depicted with the hose in an extended position. In this example of lavatory debris removal system 500, hose 508 is extended from compartment 502 for use. For example, without limitation, hose 508 may be extended from compartment 502 by pulling on handle 510.

In this example, handle 510 includes first handle portion 601 and second handle portion 602. First handle portion 601 is attached to hose 508 by handle attachment structure 604. Second handle portion 602 is attached to first handle portion 601 by hinge 606 and includes projections 608 extending therefrom. In this example, second handle portion 602 is rotated with respect to first handle portion 601 at hinge 606 into a folded position.

Figure 7:
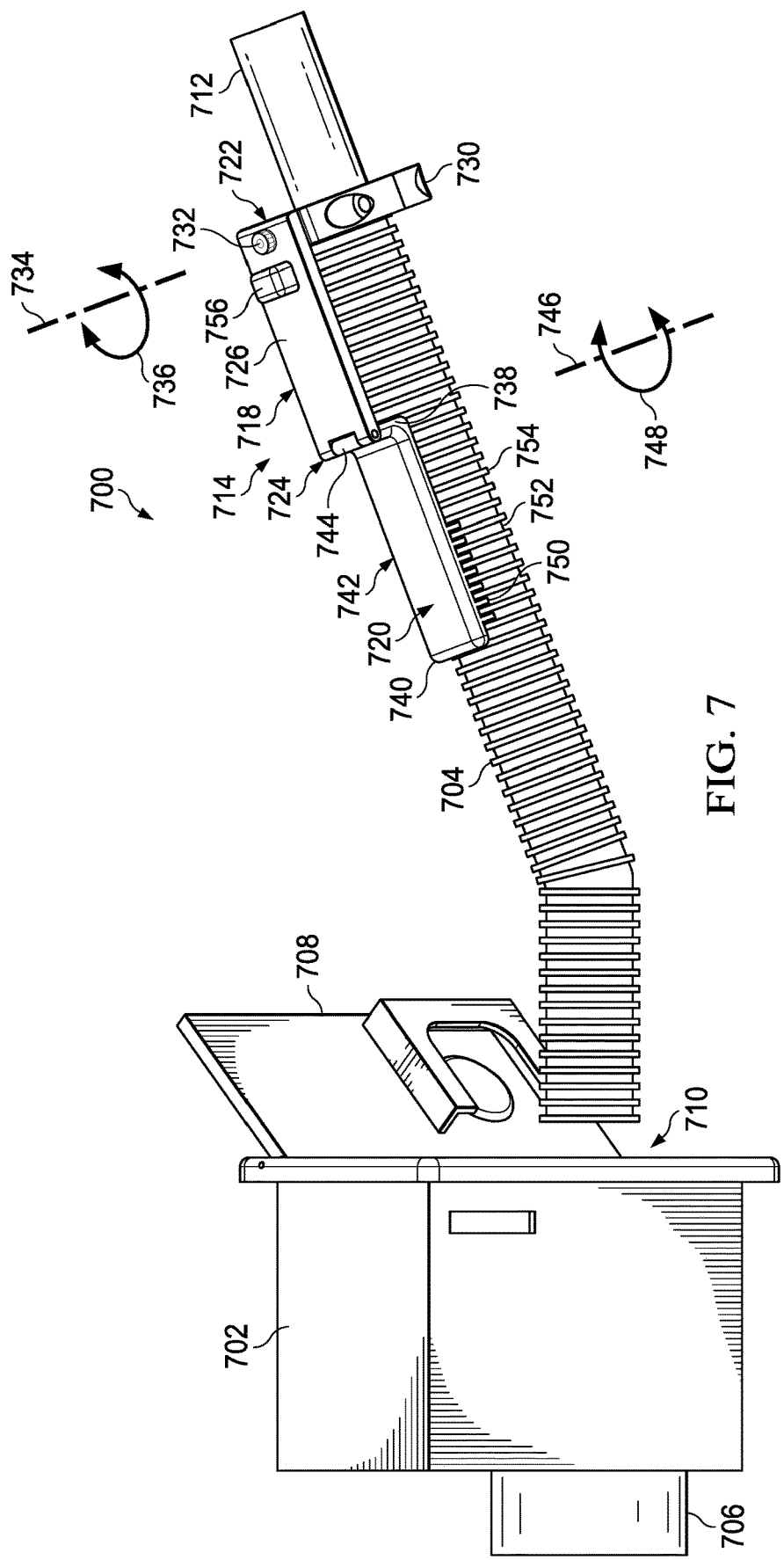
FIG. 7 is a perspective view illustration of a compartment, hose, and handle for a lavatory debris removal vacuum system with the hose detached from a vacuum socket and the handle in an unfolded use position in accordance with an illustrative embodiment.

Turning to FIG. 7, a perspective view illustration of a compartment, a hose, and a handle for a lavatory debris removal vacuum system with the hose detached from a vacuum socket and the handle in an unfolded use position is depicted in accordance with an illustrative embodiment. Lavatory debris removal vacuum system 700 may be an example of an implementation of a portion of lavatory debris removal vacuum system 100 in FIG. 1 or a portion of lavatory debris removal vacuum system 200 in FIG. 2.

Lavatory debris removal vacuum system 700 comprises compartment 702 and hose 704. Compartment 702 may be an example of one implementation of compartment 134 in lavatory debris removal vacuum system 100 in FIG. 1. Hose 704 may be an example of one implementation of tube 130 in lavatory debris removal vacuum system 100 in FIG. 1, tube 204 in lavatory debris removal vacuum system 200 in FIG. 2, or tube 300 in FIG. 3.

Compartment 702 may be configured to be installed in a wall or other appropriate structure on an aircraft or other vehicle. A vacuum socket, not shown in FIG. 7, may be located inside of compartment 702. A vacuum socket in compartment 702 may be configured to be connected to a vacuum supply line, not shown in FIG. 7, that provides suction to the vacuum socket. A vacuum socket in compartment 702 also may be configured to have hose 704 attached thereto.

Connection structure 706 may be provided for connecting a vacuum supply line to a vacuum socket in compartment 702. In the example embodiment shown in FIG. 7, connection structure 706 extends from compartment 702. However, any other appropriate structure or combination of structures may be used to connect a vacuum supply line to a vacuum socket in compartment 702. For example, without limitation, connection structure 706 may be integrally formed as part of compartment 702. Alternatively, connection structure 706 may be formed in any other appropriate manner.

Compartment cover 708 may be configured to cover an opening in compartment 702 to prevent access to a vacuum socket inside compartment 702 via the opening when compartment cover 708 is closed. Compartment cover 708 may be configured to be opened to allow access to the vacuum socket inside compartment 702 via the opening in compartment 702. In the example embodiment shown in FIG. 7, compartment cover 708 comprises a door that is connected in a hinged relation to compartment 702. However, a compartment cover that may be closed and opened to prevent and allow access to a vacuum socket inside compartment 702 may be implemented in any other appropriate manner.

Compartment 702 and hose 704 may be sized and configured in an appropriate manner such that hose 704 may be stored inside compartment 702 when hose 704 is not in use. In this case, compartment cover 708 may be closed and opened to prevent and allow access to hose 704 stored in compartment 702.

Hose 704 comprises proximal end 710 and distal end 712. Proximal end 710 of hose 704 may be configured to be attached to a vacuum socket in compartment 702 such that suction provided by a vacuum supply line to the vacuum socket is provided through hose 704. In the example embodiment shown in FIG. 7, hose 704 is detached from a vacuum socket in compartment 702. For example, without limitation, hose 704 may be detached from a vacuum socket in compartment 702 for storage of hose 704 when not in use, to remove a blockage in hose 704, for repair or replacement of hose 704, or for any other appropriate purpose or combination of purposes.

Proximal end 710 of hose 704 may be configured to be attached to a vacuum socket in compartment 702 by an operator without using tools. Proximal end 710 of hose 704 may be configured to be detached from the vacuum socket in compartment 702 by the operator without using tools. In other words, proximal end 710 of hose 704 may be configured to be attached to and detached from a vacuum socket in compartment 702 by hand.

Distal end 712 of hose 704 may be positioned by an operator in a lavatory on an aircraft or other vehicle to remove debris from the lavatory into distal end 712 of hose 704 when proximal end 710 of hose 704 is attached to a vacuum socket in compartment 702 and suction is provided by a vacuum supply line through the vacuum socket to hose 704. Handle 714 may be attached to hose 704. Handle 714 may be used by an operator to grasp hose 704 and move distal end 712 of hose 704 to desired positions in a lavatory on an aircraft or other vehicle to remove debris from the lavatory into the distal end 712 of hose 704 when suction is provided on hose 704. Handle 714 may be an example of one implementation of handle 132 attached to hose 130 in lavatory debris removal vacuum system 100 in FIG. 1, handle 206 attached to hose 204 in lavatory debris removal vacuum system 200 in FIG. 2, or handle 302 attached to hose 300 in FIG. 3.

Handle 714 comprises first handle portion 718 and second handle portion 720. First handle portion 718 includes first end 722, second end 724, and top side 726. In this example, handle 714 is shown swiveled into a use position with respect to hose 710 and with second handle portion 720 rotated with respect to first handle portion 718 at into an unfolded position for use.

First handle portion 718 is connected to hose 710 at first end 722 of first handle portion 718 by handle attachment structure 730. First handle portion 718 is connected to handle attachment structure 730 by swivel connection 732. Swivel connection 732 may be implemented in any appropriate manner such that handle 714 may be moved between a storage position and a use position with respect to hose 710 by rotating handle 714 about swivel axis 734 in the directions indicated by arrows 736.

Second handle portion 720 comprises first end 738, second end 740, and first side 742. First end 738 of second handle portion 720 is connected to second end 724 of first handle portion 718 at hinge 744. Hinge 744 may be implemented in any appropriate manner such that second handle portion 720 may be moved between a folded position and an unfolded position with respect to first handle portion 718 by rotating second handle portion 720 about hinge axis 746 in the directions indicated by arrows 748. Projections 750 on a second side of second handle portion 720 may be configured to engage grooves 752 between projections 754 on hose 704 when second handle portion 720 is in an unfolded position with respect to first handle portion 718 and, for example, without limitation, hose 704 is a corrugated hose or other type of corrugated tube. Spacer 756 may be provided on top side 726 of second handle portion 718 to prevent first side 742 of second handle portion 720 from contacting top side 726 of first handle portion 718 when second handle portion 720 is in a folded position with respect to first handle portion 718.

Figure 8:
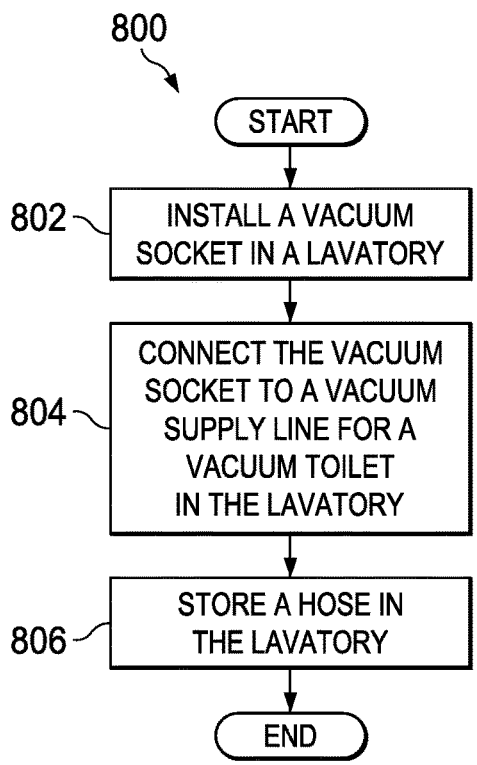
FIG. 8 is an illustration of a flowchart of a process for manufacturing a lavatory debris removal vacuum system in accordance with an illustrative embodiment.

Turning to FIG. 8, an illustration of a flowchart of a process for manufacturing a lavatory debris removal vacuum system is depicted in accordance with an illustrative embodiment. Process 800 may be an example of one process for implementing lavatory debris removal vacuum system 100 in FIG. 1 or lavatory debris removal vacuum system 200 in FIG. 2. For example, without limitation, process 800 may be used to install a lavatory debris removal vacuum system in accordance with an illustrative embodiment on an aircraft or other vehicle during manufacturing of a new aircraft or other vehicle. Alternatively, without limitation, process 800 may be used to retrofit a lavatory debris removal vacuum system in accordance with an illustrative embodiment on a on an aircraft or other vehicle that is already constructed. As another alternative, without limitation, process 800 may be used to install a lavatory debris removal vacuum system in accordance with an illustrative embodiment on a modular lavatory that is later installed on an aircraft or other vehicle.

Process 800 may include installing a vacuum socket in a lavatory (operation 802). The vacuum socket may be connected to a vacuum supply line for a vacuum toilet in the lavatory to provide suction to a tube when the tube is attached to the vacuum socket (operation 804). A tube that is configured to be attached to the vacuum socket also may be stored in the lavatory (operation 806), with the process terminating thereafter. For example, without limitation, operation 802 may include installing a compartment in a wall or other appropriate structure in the lavatory. In that case, operation 806 may include storing the tube in the compartment.

Figure 9:
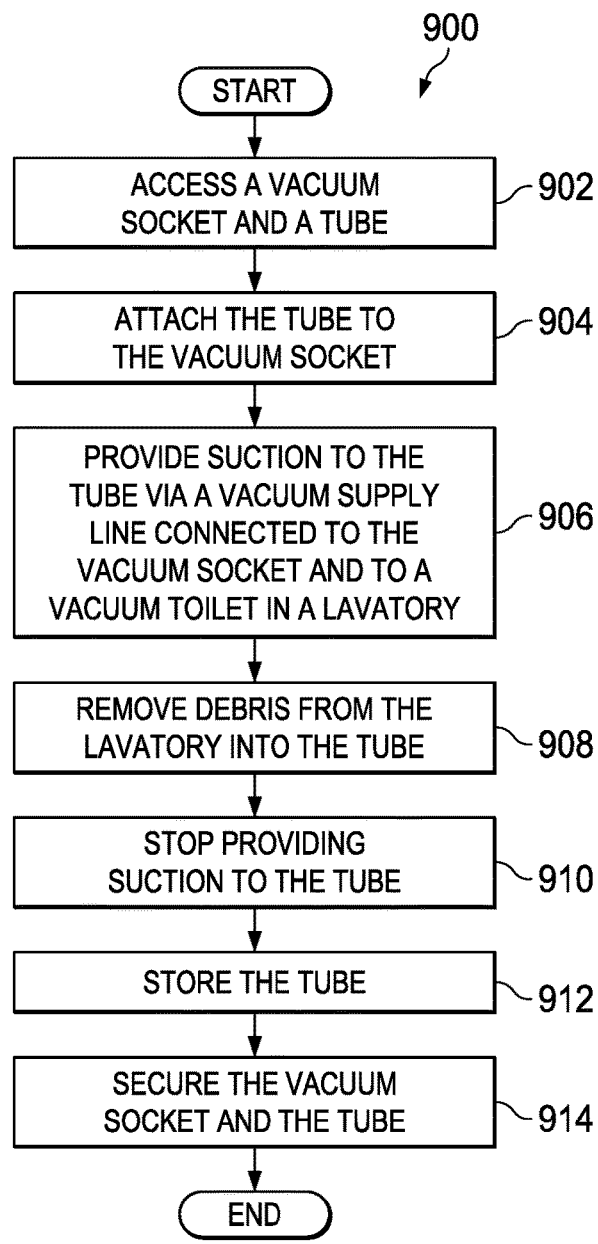
FIG. 9 is an illustration of a flowchart of a process for removing debris from a lavatory in accordance with an illustrative embodiment.

Turning to FIG. 9, an illustration of a flowchart of a process for removing debris from a lavatory is depicted in accordance with an illustrative embodiment. Process 900 may be an example of a process of using lavatory debris removal vacuum system 100 to remove debris 101 from lavatory 102 in FIG. 1.

Process 900 may include accessing a vacuum socket and a tube (operation 902). For example, without limitation, the vacuum socket and the tube may be accessed from a compartment in a wall or other appropriate structure in the lavatory. The tube may be attached to the vacuum socket (operation 904). For example, without limitation, the tube may be attached to the vacuum socket by an operator without using tools. Suction then may be provided to the tube via a vacuum supply line connected to the vacuum socket and to a vacuum toilet in the lavatory (operation 906). For example, without limitation, suction may be provided to the tube via the vacuum supply line in response to operation of an appropriate actuator by the operator. Debris may be removed from the lavatory by sucking the debris into the tube (operation 908).

After the debris is removed from the lavatory, the suction may stop being provided to the tube (operation 910). The tube may then be stored for later use (operation 912). For example, without limitation, the tube may be stored in the compartment. The vacuum socket and the tube may then be secured (operation 914), with the process terminating thereafter. For example, without limitation, the vacuum socket and the tube may be secured by limiting access to the vacuum socket and the tube in a compartment using an appropriate cover for the compartment and a lock.

Figure 10:
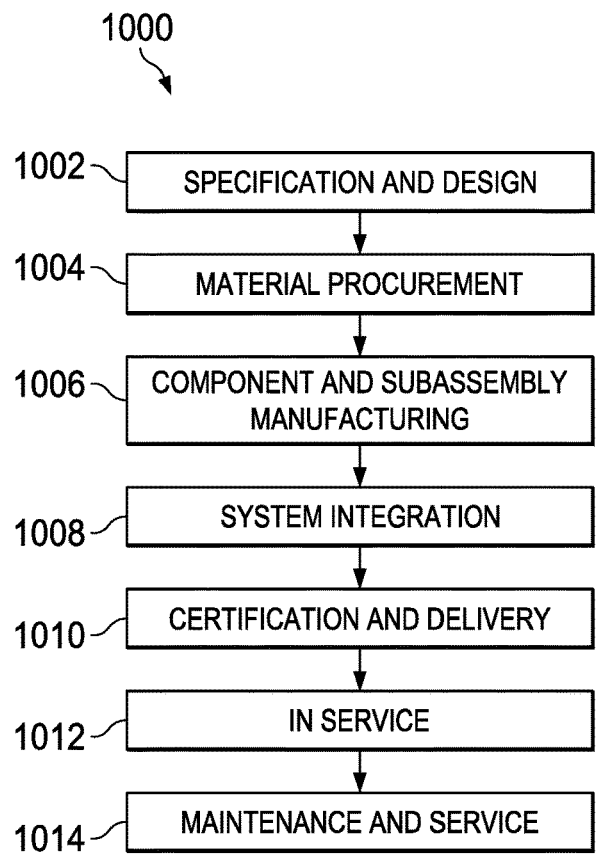
FIG. 10 is an illustration of an aircraft manufacturing and service method in the form of a block diagram in accordance with an illustrative embodiment.
Figure 11:
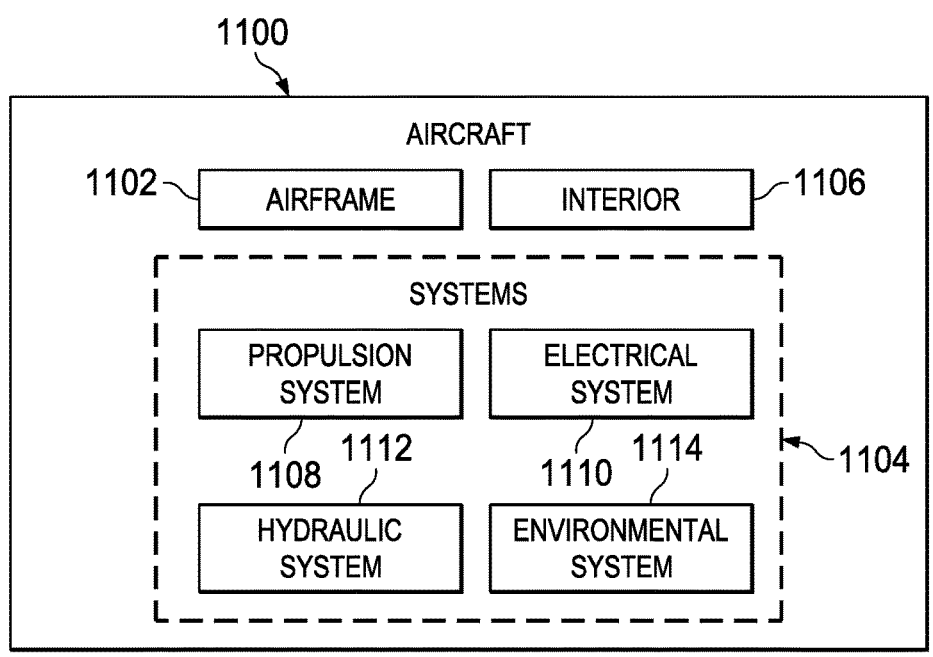
FIG. 11 is an illustration of an aircraft in the form of a block diagram in which an illustrative embodiment may be implemented.

The illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in the form of a block diagram in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in the form of a block diagram in which an illustrative embodiment may be implemented. In this example, aircraft 1100 is produced by aircraft manufacturing and service method 1000 in FIG. 10 and may include airframe 1102 with a plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012 and/or during maintenance and service 1014 in FIG. 10. The use of a number of the different illustrative embodiments may substantially expedite the assembly of and/or reduce the cost of aircraft 1100.

The apparatuses and methods embodied herein may be employed during at least one of the stages of aircraft manufacturing and service method 1000 in FIG. 10. For example, without limitation, a lavatory debris removal vacuum system in accordance with an illustrative embodiment may be installed on aircraft 1100 during at least one of component and subassembly manufacturing 1006, system integration 1008, routine maintenance and service 1014, or some other stage of aircraft manufacturing and service method 1000. Still further, a lavatory debris removal vacuum system in accordance with an illustrative embodiment may be used to remove debris from a lavatory on interior 1106 of aircraft 1100 while aircraft 1100 is in service 1012 in FIG. 10.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A machine configured to connect to a vacuum toilet, such that the machine comprises:
    a hose that comprises:
        a proximal end connected to a vacuum supply line connected to a vacuum system of the vacuum toilet such that an actuation of the vacuum toilet equates to an actuation of a suction in the hose;
        a distal end that comprises a handle and configured to extend away from the vacuum supply line;
    a compartment that comprises:
        a wall that comprises an opening configured as an entry for the hose into and extension of the hose through the compartment; and
        a side, opposite the opening, of the compartment that comprises a cover configured to rotate open and lock closed, such that the cover comprises a size large enough to allow manual access to the handle in a storage position, such that the handle comprises: a first handle portion hinged to a second handle portion, such that the first handle portion comprises:
            a first end of the first handle portion connected to a swivel connection connected to an attachment structure; and
            a second end of the first handle portion connected to a hinge connected to a first end of the second handle portion, the swivel connection configured to rotate the handle from the storage position to a use position such that:
                in the storage position a first side of a second end of the second handle portion rests upon a spacer on a top side of the first end of the first handle portion aligned above the swivel connection with the hinge aligned over the distal end of the hose; and
                in the use position, the second end of the first handle portion extends away from the distal end of the hose, and projections that extend from a second side of the second handle portion and engage with the hose.
2. The machine of claim 1, further comprising:
    the vacuum toilet configured to operate in a pressurized portion of an aircraft; and
    the vacuum supply line comprises a valve, between the vacuum toilet and a vent connected to an outside of the pressurized portion of the aircraft, configured to provide a suction to the vacuum supply line in an open position.
3. The machine of claim 1, wherein:
    the vacuum toilet comprises an actuator configured to activate the suction from the vacuum supply line to the vacuum toilet.
4. The machine of claim 1, further comprising the cover, in a closed and locked position, configured to cover the distal end.
5. The machine of claim 4 further comprising:
    a lock for the cover, wherein the cover is configured to prevent access to the hose in the compartment when the cover is locked with the lock.
6. The machine of claim 1 further comprising the hose configured to detach, without tools, from the vacuum supply line.
7. The machine of claim 1 further comprising
    the second handle portion configured to rotate between a folded position and an unfolded position with respect to the first handle portion, wherein the first side of the second handle portion faces the top side of the first handle portion when the second handle portion is in the folded position with respect to the first handle portion, and the second side of the second handle portion faces the hose when the second handle portion is in the unfolded position with respect to the first handle portion.
8. A method of manufacturing a debris removal vacuum system, comprising:
    installing a machine in a lavatory, the machine comprising:
        a hose comprising:
            a proximal end connected to a vacuum supply line connected to a vacuum system of a vacuum toilet such that an actuation of the vacuum toilet equates to an actuation of a suction in the hose;
            a distal end comprising a handle and configured to extend away from the vacuum supply line;
        a compartment comprising:
            a wall comprising an opening configured as an entry for the hose into and extension of the hose through the compartment; and
            a side, opposite the opening, of the compartment comprising a cover configured to rotate open and lock closed, such that the cover comprises a size large enough to allow manual access to the handle in a storage position, such that the handle comprises: a first handle portion hinged to a second handle portion, such that the first handle portion comprises:
                a first end of the first handle portion connected to a swivel connection connected to an attachment structure; and
                a second end of the first handle portion connected to a hinge connected to a first end of the second handle portion, the swivel connection configured to rotate the handle from the storage position to a use position such that:
                    in the storage position a first side of a second end of the second handle portion rests upon a spacer on a top side of the first end of the first handle portion aligned above the swivel connection with the hinge aligned over the distal end of the hose; and in the use position, the second end of the first handle portion extends away from the distal end of the hose, and projections that extend from a second side of the second handle portion and engage with the hose; and providing suction to the vacuum toilet and the hose and positioning the hose within the lavatory and thereby picking up debris from the lavatory.

9. The method of claim 8, further comprising:
the lavatory being in a pressurized portion of an aircraft; and
providing the suction on the vacuum supply line when the vacuum supply line is open between the lavatory and a vent located outside of the pressurized portion of the aircraft.

10. The method of claim 8, wherein the vacuum system further comprises an actuator in the lavatory, wherein the suction is provided on the vacuum supply line to the vacuum toilet in response to operating the actuator.

11. The method of claim 8, further comprising installing the compartment on a wall of the lavatory, the compartment positioned on the wall of the lavatory such that the distal end of the hose is extendable from the compartment into the lavatory.

12. The method of claim 11, further comprising installing a lock for the cover, wherein the cover is configured to prevent access to a vacuum socket and the hose in the compartment when the cover is locked with the lock.

13. The method of claim 8, further comprising:
attaching the hose to the vacuum supply line without using tools; and
detaching the hose from the vacuum supply line without using the tools.

14. A method of removing debris from a lavatory on a vehicle, the method comprising:
providing suction from a machine comprising:
a hose comprising:
a proximal end connected to a vacuum supply line connected to a vacuum system of a vacuum toilet such that an actuation of the vacuum toilet equates to an actuation of a suction in the hose;
a distal end comprising a handle and configured to extend away from the vacuum supply line;
a compartment comprising:
a wall comprising an opening configured as an entry for the hose into and extension of the hose through the compartment; and
a side, opposite the opening, of the compartment comprising a cover configured to rotate open and lock closed, such that the cover comprises a size large enough to allow manual access to the handle in a storage position, such that the handle comprises: a first handle portion hinged to a second handle portion, such that the first handle portion comprises:
a first end of the first handle portion connected to a swivel connection connected to an attachment structure; and
a second end of the first handle portion connected to a hinge connected to a first end of the second handle portion, the swivel connection configured to rotate the handle from the storage position to a use position such that:
in the storage position a first side of a second end of the second handle portion rests upon a spacer on a top side of the first end of the first handle portion aligned above the swivel connection with the hinge aligned over the distal end of the hose; and
in the use position, the second end of the first handle portion extends away from the distal end of the hose, and projections that extend from a second side of the second handle portion and engage with the hose; and extending the hose from the vacuum supply line into the lavatory and removing debris from the lavatory into the hose.

15. The method of claim 14, wherein:
the vehicle is an aircraft:
the lavatory is in a pressurized portion of the aircraft; and
the suction is provided on the vacuum supply line when the vacuum supply line is open between the lavatory and a vent located outside of the pressurized portion of the aircraft.

16. The method of claim 14 further comprising operating an actuator in the lavatory by an operator, wherein the suction is provided on the vacuum supply line to the vacuum toilet in response to the operating of the actuator.

17. The method of claim 14, further comprising:
the compartment located on a wall of the vehicle; and
extending the distal end of the hose from the compartment into the lavatory.

18. The method of claim 17, further comprising:
unlocking a lock on the cover;
opening the cover; and
accessing the hose in the compartment.

19. The method of claim 14 further comprising:
attaching the hose to the vacuum supply line without using tools; and
detaching the hose from the vacuum supply line without using the tools.

20. The method of claim 14 further comprising holding the hose by the handle and positioning the distal end of the hose in the lavatory.

* * * * *